United States Patent
Johnson et al.

(10) Patent No.: US 7,002,981 B2
(45) Date of Patent: Feb. 21, 2006

(54) METHOD AND ARBITRATION UNIT FOR DIGITAL SWITCH

(75) Inventors: Ian David Johnson, Littlehampton (GB); Simon William Farrow, Victoria Park (GB); Marek Stephen Piekarski, Macclesfield (GB); Paul Graham Howarth, Sale (GB)

(73) Assignee: Xyratex Technology Limited, Havant (GB)

( * ) Notice: Subject to any disclaimer, the term of this patent is extended or adjusted under 35 U.S.C. 154(b) by 1001 days.

(21) Appl. No.: 09/858,437

(22) Filed: May 16, 2001

(65) Prior Publication Data

US 2002/0001304 A1 Jan. 3, 2002

(30) Foreign Application Priority Data

May 24, 2000 (GB) .................................... 0012592
Mar. 16, 2001 (WO) ..................... PCT/GB01/01137

(51) Int. Cl.
*H04L 12/50* (2006.01)
(52) U.S. Cl. ...................... 370/416; 370/360; 370/461; 370/462; 340/2.2
(58) Field of Classification Search ................ 370/229, 370/230, 351, 357, 360–362, 386, 398, 412, 370/413, 415, 416; 340/2.1, 2.24, 2.28, 2.2
See application file for complete search history.

(56) References Cited

U.S. PATENT DOCUMENTS

| 5,500,858 | A |   | 3/1996 | McKeown ................... 370/412 |
| 5,642,349 | A | * | 6/1997 | Cloonan et al. ............. 370/360 |
| 5,734,649 | A | * | 3/1998 | Carvey et al. ............... 370/355 |
| 5,923,644 | A | * | 7/1999 | McKeown et al. .......... 370/230 |
| 6,212,182 | B1 | * | 4/2001 | McKeown ................... 370/390 |
| 6,351,466 | B1 | * | 2/2002 | Prabhakar et al. .......... 370/413 |
| 6,370,148 | B1 | * | 4/2002 | Calvignac et al. .......... 370/412 |
| 6,424,655 | B1 | * | 7/2002 | Horst .......................... 370/412 |
| 6,614,796 | B1 | * | 9/2003 | Black et al. ................. 370/403 |
| 6,625,121 | B1 | * | 9/2003 | Lau et al. .................... 370/230 |
| 6,633,580 | B1 | * | 10/2003 | Tøslashed.rudbakken et al. ........................... 370/461 |
| 6,724,779 | B1 | * | 4/2004 | Alleyne et al. .............. 370/517 |
| 6,735,212 | B1 | * | 5/2004 | Calamvokis ................. 370/412 |

OTHER PUBLICATIONS

Mekkittikul et al, A Practical Scheduling Algorithm to Achieve 100% Troughput in Input-Queued Switches, IEEE 1998, pp. 792-799.*
McKeown: *The Islip Scheduling Algorithm for Input-Queued Switches*IEEE/ACM Transactions on Networking, US, IEEE Inc. New York, vol. 7, No. 2, Apr. 1999 (1999-94), pp. 188-201, XP000828686 ISSN: 1063-6692.

* cited by examiner

*Primary Examiner*—John Pezzlo
*Assistant Examiner*—Ahmed Elallam
(74) *Attorney, Agent, or Firm*—Bracewell & Giuliani LLP (57) ABSTRACT

In a data switching system, the ingress and egress ports of a memoryless cross-bar switch are controlled by an arbitration method. The arbitration method uses a three phase process involving (i) a request phase in which each ingress port sends its connection requests to egress ports to which a connection is required, (ii) a grant phase in which each egress port uses a grant pointer to select one of the requests directed to it using a grant pointer, and generates a grant signal, and (iii) an accept phase in which each ingress port selects one of the received grant signals to accept, so defining an ingress to egress port connection across the cross-bar switch. The transition sequences for each of the grant pointers are mutually exclusive, so that any synchronisation of the grant pointers is eliminated on the next arbitration cycle. This is arranged by a setting of the paths taken by request and grant signals.

8 Claims, 5 Drawing Sheets

Egress Port Number

|  | | 0 | 1 | 2 | 3 |
|---|---|---|---|---|---|
| Original Pointer Value | 0 | 0 | 1 | 2 | 3 |
| | 1 | 1 | 2 | 3 | 0 |
| | 2 | 3 | 0 | 1 | 2 |
| | 3 | 2 | 3 | 0 | 1 |

Mapped Pointer Value

*Fig. 3(b)*

| M \ P | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 2 | 3 | 4 | 5 | 6 | 7 | 0 |
| 2 | 3 | 4 | 5 | 6 | 7 | 0 | 1 | 2 |
| 3 | 6 | 7 | 0 | 1 | 2 | 3 | 4 | 5 |
| 4 | 2 | 3 | 4 | 5 | 6 | 7 | 0 | 1 |
| 5 | 7 | 0 | 1 | 2 | 3 | 4 | 5 | 6 |
| 6 | 5 | 6 | 7 | 0 | 1 | 2 | 3 | 4 |
| 7 | 4 | 5 | 6 | 7 | 0 | 1 | 2 | 3 |

METHOD AND ARBITRATION UNIT FOR DIGITAL SWITCH

FIELD OF THE INVENTION

The present invention relates to arbiters for use in data switching systems and is more particularly concerned with so-called "bipartite graph" matching for use in arbitrating between connection requests for cross bar connections in a data switching system.

BACKGROUND OF THE INVENTION

In a known data packet switching apparatus, a data switch is provided with a plurality of ingress ports for a plurality of respective data sources, a plurality of egress ports for a plurality of respective data destinations, a cross-bar switch (also referred to as a switching matrix) for selectively interconnecting ingress ports and egress ports, and a control unit for controlling the cross-bar switch. The ingress ports receive data packets including a header indicating a desired destination of the data packet, and generate and transmit to the control unit a request for a connection to the corresponding egress port. The control unit performs, in each of a number of "switching cycles", an arbitration process to arbitrate among the requests it receives (which in general will not be compatible) to determine a compatible sub-set of the requests, and controls the cross-bar switch to realise that sub-set of requests. The arbitration process is an example of a bipartite graph matching problem.

At present, bipartite graph matching algorithms that can be implemented in hardware are based upon round robin pointer manipulation schemes. When a round robin is implemented to share a particular resource among a plurality of processes, the round robin implements a two-stage arbitration, in which, in a first stage, the processes generate requests to access the resource, and in the second "grant" stage, the resource decides which of those requests to grant. To implement the "grant" stage some form of pointer is used. The pointer can point to one of a number of locations corresponding to respective processes. In the simplest implementation of the round robin, the pointer moves from one location to the next in a predefined sequence once every operation cycle. If there is request corresponding to the location indicated by the pointer, the process corresponding to that location is granted access to the resource, and accordingly that process is sent a signal referred to here as a "grant". If there is nothing at the location selected (i.e. the corresponding process has not made a request to use the resource) then nothing is done until the next cycle. A logical extension to the round robin allows the pointer to skip locations that do not have any requests for the resource; this increases the efficiency of the algorithm. The pointer at any time indicates the last location to which a grant was given.

If, as well as multiple processes, there are multiple resources (a situation corresponding to the data switch described above, in which there are multiple egress ports to which the ingress ports may be granted a connection) an extra final stage is added. The first two stages of the arbitration are the same as described above: each resource uses a round robin mechanism using a pointer known as a "grant pointer", to decide, among the processes which send that resource a request, which of those requests to grant. However, as there are multiple resources, each of the requesting processes which receive more than one grant must "accept" one of those grants in order to ensure exclusive access. To perform this third "accept" stage of the arbitration, each of the processes is provided with a round robin arbitration mechanism, including a pointer to indicate which, among the plurality of resources, was the one which it last accepted. One of the plurality of grants is selected using this "accept pointer".

When a three-stage arbiter of this kind is constructed from just round robin pointers, efficiency is reduced under high load due to an effect known as pointer synchronisation. Pointer synchronisation means that the grant pointers for a plurality of resources (and/or the accept pointers for a plurality of the processes), become synchronised.

For example, in the case of the switch, if a single ingress port (corresponding to a process) continually requests connections to all the egress ports and no other ingress ports request connections, then multiple grant pointers (i.e. the pointers associated with the egress ports) will come to point to the single ingress port. This creates a problem if there is a fluctuation in the traffic pattern so that all ingress ports send requests to all egress ports. Only one can be granted, causing a reduction in the overall efficiency of the arbiter and an increase in the effective load. Any inefficiency that arises in the arbiter will therefore be self-sustaining. Some method of changing the pointers relative position is therefore desirable.

Several methods are known which attempt to solve the pointer synchronization problem. One of these, known as SLIP, is disclosed in U.S. Pat. No. 5,500,858A to N. W. McKeown. Starting from a state in which the pointers are fully synchronised, SLIP achieves desynchronisation of the pointers, but only after a number of arbitration cycles which is equal to the number of ingress ports.

SUMMARY OF THE INVENTION

It is an object of the present invention to provide an arbitration method which overcomes, or at least alleviates, the above mentioned pointer synchronisation problem.

According to the invention there is provided an arbitration method for use in selecting the connections to be made between ingress and egress ports of a memoryless cross-bar switch of a data switching system, the arbitration method comprising a three phase process involving (i) a request phase in which each ingress port sends its connection requests to the egress ports to which a connection is required, (ii) a grant phase in which each egress port examines in a round-robin manner the requests directed to it using a grant pointer, and selects one request for grant returning a grant signal indicative of the selected request and directed to the ingress port which sent the selected request, and (iii) an accept phase in which each ingress port examines in a round-robin manner the received grant signals and selects one to accept thereby defining an ingress to egress port connection across the cross-bar switch, characterised in that the transition sequences for each of the grant pointers are mutually exclusive.

This concept is motivated by noting that the worst case for pointer synchronisation is for all of the grants to go to one location (i.e. one ingress port), since an arbiter in this state will have its efficiency reduced to 1/number of ports. In the present invention, however, all the pointers would move to different locations on the next arbitration cycle.

The transitions may be represented by a table having columns representing respective egress ports. The entries in the table along any column represent, in order, the ingress ports to which the grant pointer of the corresponding egress port points, such that consecutive vertically descending positions represent the consecutive ingress ports to which the corresponding grant pointer points. Since the transition sequences are mutually exclusive, the table should not contain, in the same vertically descending order, multiple instances of any consecutive combination of a first ingress port and a second ingress port.

However, in real situations, it is not in fact necessary that this condition is met absolutely. In practice, we define the statement that the transition sequences are "mutually exclusive" to mean that the transition sequences are such that, considering the respective points in each of the sequences which are any given ingress port, the number of sequences having a common ingress port as the next ingress port in the sequence is small compared to the number of ingress ports—such as at most two.

This definition of mutually exclusive makes it possible to include the highly preferable feature that there are no "static transitions" (i.e. no sequences in which the same ingress port appears twice consecutively).

The simplest way to cause the grant pointers to follow different paths, while keeping all other components of the arbiter the same as in known systems, is to reconnect the request and grant signals in a new order. In this case, the table represents a connection matrix defining the request and grant signal paths. In other words, the column corresponding to a given grant pointer represents the order in which the ingress ports are connected to it. A useful aspect of reordering the pointers in this way is that no extra gates are required to implement the required changes.

Preferably, the entries of the table conform to the formula:

$$M^* = \left(P + \frac{M(M+1)}{2}\right) \bmod N \quad (1)$$

where M* is the mapped pointer location, M is the round-robin pointer location, P is the egress port number and N is the number of cross-bar switch ports.

Preferably, the arbiter of the present invention employs, for each possible combination of an ingress port and an egress port, a respective weight value, and a connection request is only selected in said grant step if the corresponding weight value is not zero. Each time a connection is made in the crossbar switch involving an ingress port and an egress port, the corresponding weight value is decremented. In said grant step, if for a given egress port, there are no connection requests having non-zero weight values, the weight values are reset to default values before said selection.

The default values (which are positive integers) thus determine the statistical frequency with which a given ingress and egress port will be selected. In principle it is possible to select the default values for each combination of an ingress and an egress port to be equal. However, it is preferable that the default values are not all identical, for a given egress port but rather there are different default values for each respective ingress port, selected according to a desired statistical frequency of connections between specific ingress and egress ports.

BRIEF DESCRIPTION OF THE FIGURES

FIG. 3, which is composed of FIGS. 3(a) and 3(b), shows an example of how the request and grant signals are connected in the first embodiment of the invention;

DETAILED DESCRIPTION OF THE FIGURES

Figure 1:
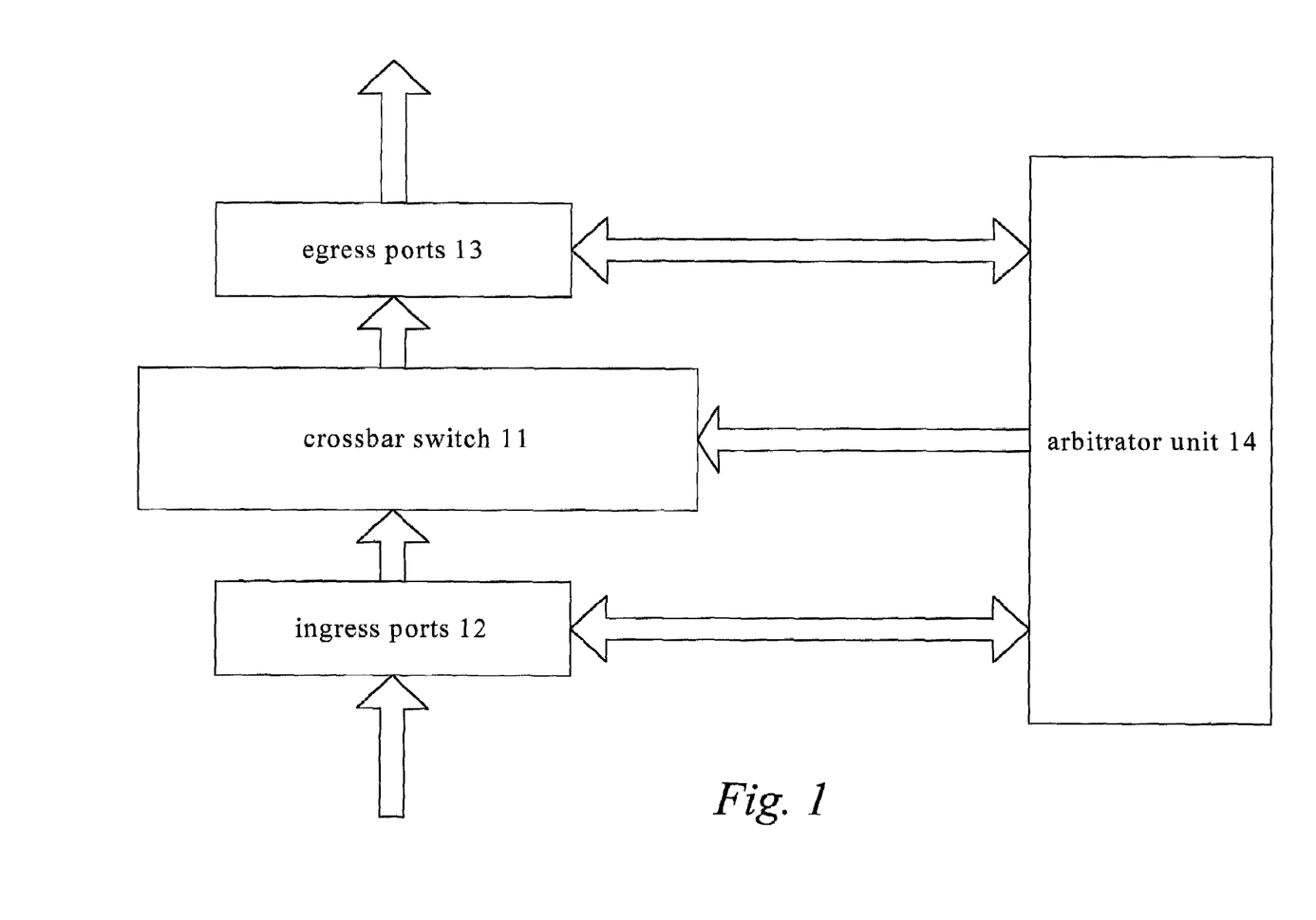
FIG. 1 shows a data switch which is a first embodiment of the invention.

Referring to FIG. 1, a first embodiment of the invention is shown as having the known structure of a data switch. It includes a set of four ingress ports 12 (shown as a single unit), a set of four egress ports 13 (also shown as a single unit), a cross-bar switch 11 and a arbitrator unit 14 which controls the crossbar switch to selectively interconnect the ingress and egress ports. The ingress ports 12 receive data packets (from the left side of the figure) for transmission to the egress ports 13 (which transmit them on to the right side of the figure), and generate requests for appropriate connections in the crossbar switch 11 accordingly. The requests are sent to an arbitrator unit 14, which decides which requests to grant, and accordingly controls the crossbar switch 11. It further notifies the ingress ports 12 and egress ports 13 of the connection which is to be made. The arbitrator unit may work within constraints set by the egress ports, for example "backpressure" constraints relating to congestion downstream of the switch (i.e. off the right side of the figure). There may be further constraints on the connections made between the ingress ports and the egress ports. For example, such constraints may concern "multicast" transmissions which are to be sent from a single ingress port to multiple egress ports, with a higher level of priority than the "unicast" data packets which are considered here.

Figure 2:
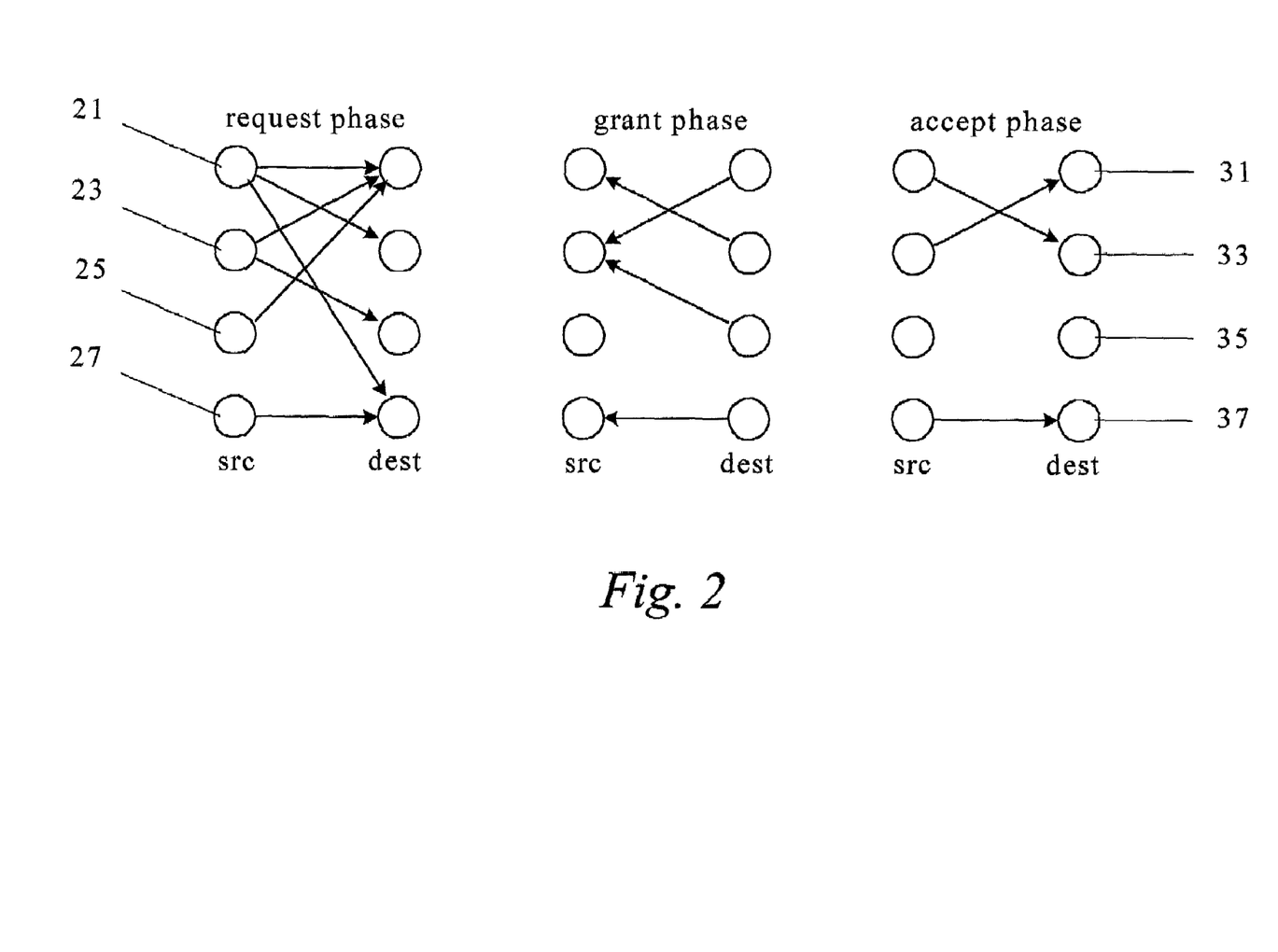
FIG. 2 shows the operation of the arbitration unit in the first embodiment of the invention.

FIG. 2 shows the schematically the internal operation of the arbitration unit 14 which is employed in the first embodiment. Each of four first portions 21, 23, 25, 27 is associated with a respective one of the ingress ports 12 (we may refer to these ports respectively as egress ports 0, 1, 2 and 3), and each of four second portions 31, 33, 35, 37 is associated with a respective one of the second ports (we may refer to these ports respectively as egress ports 0, 1, 2, and 3).

In a request phase of arbitration process (FIG. 2(a)), each first portion, which receives requests generated by corresponding ingress ports, generates request signals. Each request signal relates to a connection to be made between that ingress port and one of the egress ports, and is transmitted to the corresponding one of the second portions 31, 33, 35, 37 along a respective request signal path. In each request phase, the requests generated by the first portions are derived from all of the requests generated by the ingress ports which have not yet been satisfied (in other words the first portions 21, 23, 25, 27 may keep a store of such requests, and generate its own requests based on this store), but taking into account any constraints on the arbitration unit. The detail of how this is done are known to an expert, and will not be considered here.

In the second "grant" phase of the arbitration process (FIG. 2(b)), each of the second portions 31, 33, 35, 37, grants exactly one of the requests it receives and transmits a grant signal to the first portion concerned along a grant signal path. In the third "accept" phase of the arbitration process (FIG. 2(c)), each of the first portions 21, 23, 25, 27 which has received one or more grants, accepts exactly one of those grants, and transmits an accept signal to the second portion concerned. This completes the arbitration process.

Figure 3A:
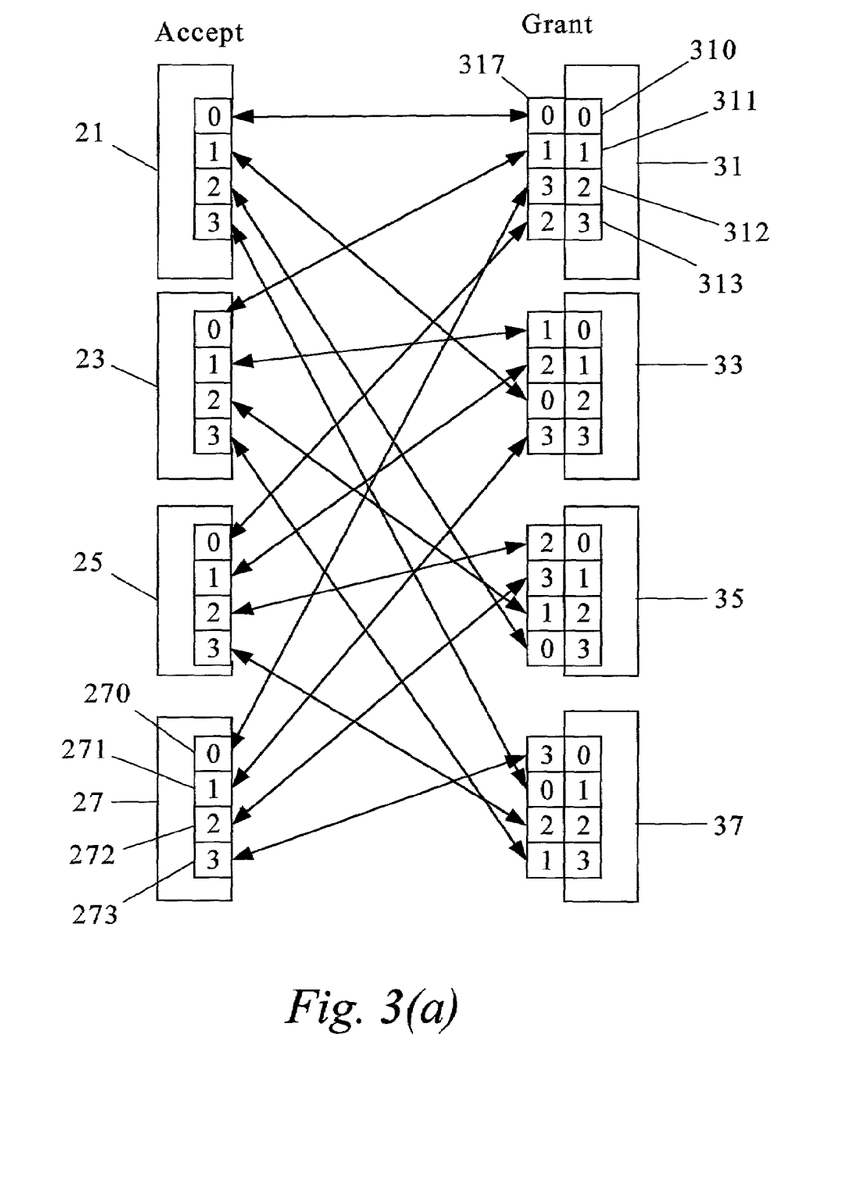

FIG. 3(a) shows schematically the request and grant signal paths used in the embodiment of the invention with N=4. Each of the first and second portions has four connections for receiving/transmitting grant/request signals. For example, the four locations in which the first portion 27 generates request signals and receives grant signals are labelled 270, 271, 272, and 273. Similarly, the four locations in which the second portion 31 receives request signals and generates grant signals are labelled 310, 311, 312, and 313. The grant pointer of the second portion points to these three locations in turn. Given the connections illustrated between the first and second grant portions, the grant pointer of second portion 31 successively points at the first portions 21, 23, 27, 25. The grant pointer of second portion 33 successively points at first portions 23, 25, 21 and 27.

For ease of understanding, each of the locations (such as 270, 271, 272, 273) on each of the first portions is marked with an integer 0, 1, 2, 3 indicating the pointer sequence 93 is followed by 0). Each of the grant pointer locations (such as 310, 311, 312, 313) on each of the first and second portions is marked with an integer 0, 1, 2, 3 indicating their grant pointer sequence, that is the value M. M=3 is followed by M=0. Also, 4-element columns (such as 317) are added before the second portions 31, 33, 35, 37 to indicate schematically the values of M* for that pointer. For example, colunm 317 has elements 0, 1, 3, 2 to indicate that, as the pointer of the second portion 31 moves through the successive locations 310, 311, 312 and 313, it points successively at the first portions 21, 23, 27, 25 which correspond to the respective ingress ports 0, 1, 3, 2.

Figure 3B:
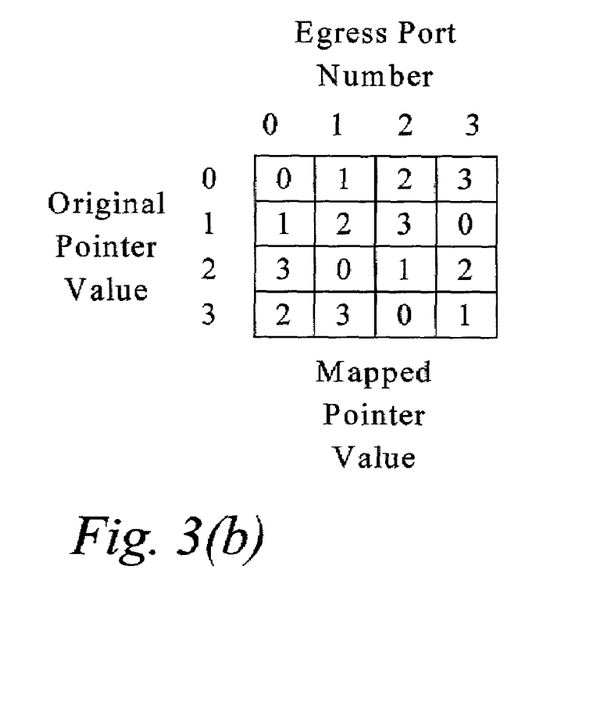

The result is as shown in FIG. 3(b), which gives for each of the egress ports P a column showing for any "original pointer value" M, the "mapped pointer calue" M* under Eqn. (1) (i.e. the next ingress port to which the location points in the present invention). For example, the column under P=0 (the egress port corresponding to second portion 31) shows that as the location 310, 311, 312, 313 moves through positions M=0, M=1, M=2, and M=3, M* moves through the sequence 0, 1, 3, 2.

Figure 4:
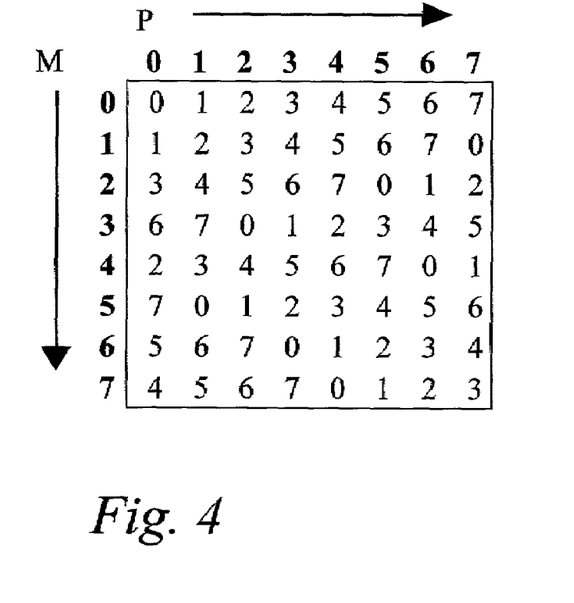
FIG. 4 shows a connection matrix in a second embodiment of the invention.

FIG. 4 shows the connection matrix in a second embodiment of the invention, having 8 ingress ports and 8 egress ports, both the ingress and egress ports being labelled 0 to 7. The entries in the matrix are given by Eqn. (1), in the case that N=8. It can be seen from the matrix in FIG. 4 that from any given starting position all of the pointers will move to completely different locations.

For example, given a starting position of zero pointer five will move to location three, pointer seven will move from zero to two.

The only exception to this is that, since static transitions are forbidden, the matrix includes at least N transitions (i.e. vertically-downward combinations of a first M* value and a second M* value) which appear in two sequences. For example, in both the P=2 sequence and the P=4 sequence, the position following the M*=0 position is the M*=4 position. That is, the 0 to 4 transition is shared in the P=2 and the P=4 sequences.

Figure 5:
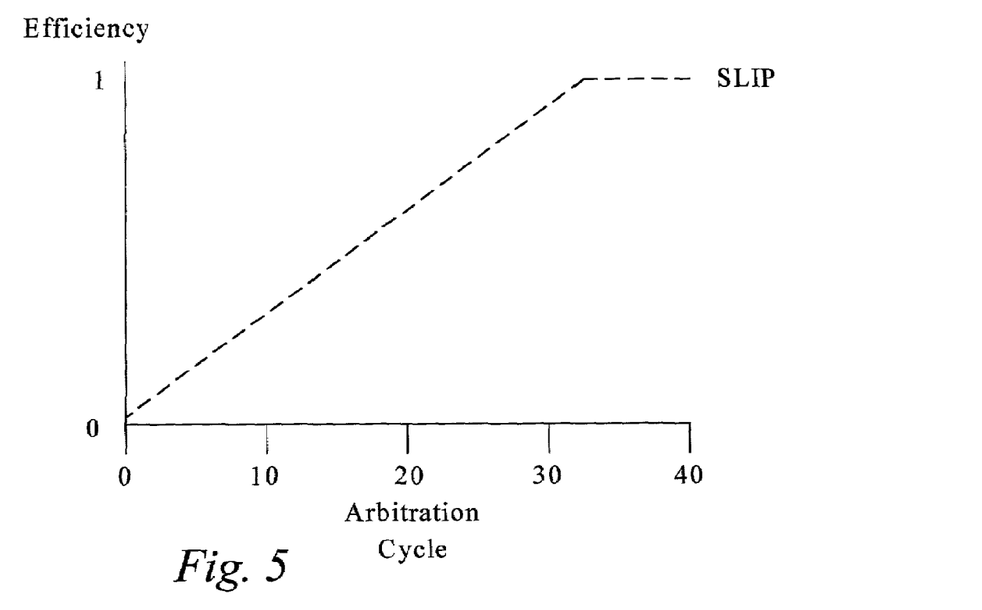
FIG. 5 shows the average efficiency of the known SLIP arbitration system, calculated over time measured in arbitration cycles, for a 32 port system.
Figure 6:
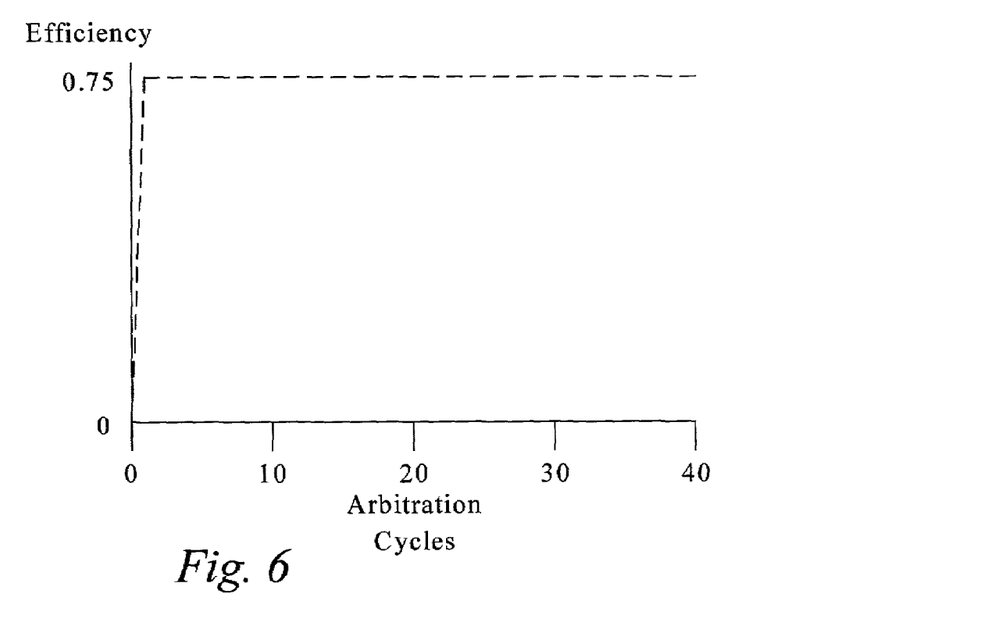
FIG. 6 shows the average efficiency of a third embodiment of the present invention.

As mentioned above, the SLIP arbiter takes N arbitration cycles to desynchronise, but having done so, the efficiency of the arbitration process approaches 100% efficiency. This is illustrated in FIG. 5, in the case that N=32. By contrast, since the pointers in the arbiter of the present invention are reordered, the desynchronisation occurs in one arbitration cycle, and the efficiency thus peaks after one cycle. This is illustrated, in the case of a third embodiment of the invention for which N=32, in FIG. 6. Note that desynchronisation of the pointers leads only to an efficiency of 75% on average. However, this efficiency can be improved if the arbitration process is supplemented by further pipeline stages of arbitration in a known way, effectively matching ingress ports and egress ports which are not already paired.

Like a round robin, the arbiter of the first three embodiments of the invention is not inherently fair under all conditions; however, when it is used in conjunction with an arrangement which allocates weights to the requests to provide bandwidth allocation, in accordance with our co-pending GB patent application no. 0017221.3, the combination guarantees fair allocation of connections.

This combination is provided in a fourth embodiment of the invention, in which the overall aim of the arbitration is to create a new connection vector every switch cycle (equal to the vector per tensor size), where the maximum possible number of connections are made every cycle to satisfy a number of pre-ordained connections (which are not considered in detail in this document) and queued unicast/multicast/broadcast requests. The process is pipelined in order hide the considerable processing required to generate each connecting vector. The fourth embodiment has the overall structure shown in FIG. 1, but the operation of the arbitration unit differs from that of known systems as discussed below.

Each ingress port (operated by a respective ingress router) maintains a plurality of queues for "unicast" requests, that is ones directed to an single egress port. There is a queue for each egress port and priority level (i.e. a total number of queues equal to the product of the number of egress ports and the number of priority levels). A separate unit determines which priority level requests are to be considered at each arbitration pipeline stage. The ingress router records the queue states for all pending connections for all combinations of the ingress port with egress ports and priorities. A single broadcast queue is also held per ingress port. Requests are removed from the queue states for attempted arbitration, and are returned to the queues to try again later when they are unsuccessful either due to being of a non-selected priority or due to clashing with a successful connection. The set of requests generated by all the ingress routers is sent to an arbitration unit as a "Request Vector".

The arbitration unit generates a Connection Vector for transmission to the switching fabric to define the connections to be made. The arbitration unit contains a RAM storing pre-ordained connections required at certain times. Connections contained in the RAM are given first refusal on all available connections in the new switch cycle. If no connections are taken by the RAM in a certain arbitration cycle, and a broadcast request is received, a broadcast connection is created. Any egress ports sending backpressure will normally preclude such a broadcast connection, unless Lossy Broadcasts have been enabled. Finally, the arbitration unit removes any requests from the incoming Request Vector that clash with existing connections, and passes on the Request Vector and the Connection Vector to the first arbitration stage.

A single arbitration stage contains three sequential phases, where each phase is considered as a unidirectional transaction between ingress and egress 'ports' (in fact, corresponding portions of the arbitration unit). In the Request phase, each ingress 'port' sends a request to each egress for which it has a request in the incoming Request Vector. In the Grant phase, each egress 'port' issues a grant for one of its incoming requests, based on a "Hashed Weighted Round Robin" method of selection, described below and in accordance with the present invention. In the final Accept phase, each ingress 'port' selects one of its incoming grants using a similar Hashed Round Robin (no weighting). Accepted grants represent successful connections generated by this arbitration stage.

As explained above in relation to the other embodiments of the present invention, a separate Hashed Weighted Round Robin is used by each egress 'port' to select one of the incoming requests to grant. For each round robin, a pointer indicates the last ingress port to which a grant was issued which was subsequently accepted. When a new set of requests arrives, the ingress ports are tested in a "hashed" order, that is one according to the present invention, for example defined by Eqn. 1, starting from the one after that indicated by the pointer, until the first with an unmasked request is found: this request is granted. The hashed order of the ports is different for each of the round robins to avoid pointer synchronisation effects. Each round robin also maintains a set of weight registers, one weight per ingress port. A request is considered masked (i.e. not a candidate for selection in the round robin) if its weight is zero: this represents a connection that is exceeding its bandwidth allocation. If the round robin finds all active request are masked by zero weights, the weights for all ports are reloaded from a set of initial values ("default values") and the requests retested. The Connection Weighting Table stores this initial weight value for every combination of ingress port and egress port, and the value controls the port-to-port bandwidth allocation. In high load situations, a large initial weight means many connections will be created before the active weights are reloaded. A large weight with no requests however does not prevent a reload of all weights where lower bandwidth connections have zero weights but more requests to service: this demonstrates the fair, work-conserving nature of the hashed weighted round robin. If a granted request is subsequently accepted, the pointer is updated to point to the granted ingress 'port' and the weight value is decremented, otherwise the pointer and weight are unchanged.

Finally, the arbitration stage adds the new connections to the incoming connection vector, and removes requests from the incoming request vector which have been accepted or which can now never be satisfied because they clash with accepted connections. The latter requests are returned to the routers, and the updated vectors are passed on down the pipeline. Note that in further pipeline stages, the set of requests considered may be different because at each pipeline stage requests of a different set of priorities are considered. For example, at the first pipeline stage, only requests of the highest priority may be included; and at second and subsequent pipeline stages, requests transmitted by the input ports may be considered irrespective of their priorities.

The cascaded second and third arbitration stages attempt to fill in gaps in the connection vector based on requests in the request vector, and each is identical to the generic arbitration stage described above. The fact that the requests are potentially at a mixture of priorities does not affect the arbitration: no preference is given to "higher" priority requests. The requests emerging unsatisfied from the final arbitration stage are returned to the routers together with the usual blocked requests. The final connection vector from this stage is processed for virtual port addressing and port shadowing, passed to the switching fabric, and used to generate grants and incoming tensor indications to the ingress and egress ports respectively.

The invention claimed is:

1. An arbitration method for use in selecting the connections to be made between ingress and egress ports of a memoryless cross-bar switch of a data switching system, the arbitration method comprising a three phase process involving (i) a request phase in which each ingress port sends its connection requests to the egress ports to which a connection is required, (ii) a grant phase in which each egress port examines in a round-robin manner the requests directed to it using a grant pointer, and selects one request for grant returning a grant signal indicative of the selected request and directed to the ingress port which sent the selected request, and (iii) an accept phase in which each ingress port examines in a round-robin manner the received grant signals and selects one to accept thereby defining an ingress to egress port connection across the cross-bar switch, characterized in that the transition sequences for each of the grant pointers are mutually exclusive;

in which the mutually exclusive transitions are determined by a connection matrix setting the pathways of request and grant signals; and wherein said connection matrix may be represented by a table having columns representing respective egress ports, the entries in the table along any colunm represent, in vertically descending order, the ingress ports to which the grant pointer of the corresponding egress port points, and the table does not contain, in the same vertically descending order, multiple instances of any combination of a first ingress port and a second ingress port.

2. A method according to claim 1 wherein the entries in the table conform to the formula:

$$M^* = \left(P + \frac{M(M+1)}{2}\right) \mathrm{mod} N$$

wherein N is the number of egress ports, M is an integer index in the range 0, . . . , (N−1) which labels the rows of the matrix, P is an integer index in the range 0, . . . , (N−1) which labels the N columns of the matrix, and M* is the entry in the table at row M and column P.

3. A method according to claim 1 which employs, for each possible combination of an ingress port and an egress port, a respective weight value, a connection request only being selected in said grant if the corresponding weight value is not zero;

the method further comprising:

each time a connection is made in the crossbar switch involving an ingress port and an egress port, decrementing the corresponding weight value; and in said grant phase, if for a given egress port, there are no connection requests having a non-zero weight values, the weight values are reset to default values before said selection.

4. A method according to claim 3 including a further step of setting said default values according to a desired statistical frequency of connections between specific ingress and egress ports.

5. An arbitration unit for use as a data switching system comprising a plurality of ingress ports, a plurality of egress ports, a memory-less cross-bar switch and said arbitration unit for controlling the switch, the arbitration unit comprising:

a respective first portion for each of said ingress ports, and a respective second portion for each of the egress ports;

each first portion being arranged to transmit connection request signals relating to required connections between the corresponding ingress port and the egress ports, to the second portions corresponding to those egress ports;

each second portion being arranged to define a grant pointer having a transition sequence, to examine in a round-robin manner using the corresponding grant pointer the request signals directed to it, to select one request signal for grant, and to return to the first portion which transmitted that request signal a grant signal indicative of the selected request;

each first portion further being arranged to examine in a round-robin manner the received grant signals and select one to accept, thereby defining an ingress to egress port connection across the cross-bar switch;

characterized in that the transition sequence for each of the grant pointers are mutually exclusive;

further including a connection matrix determining the mutually exclusive transitions by defining the pathways of the request and grant signals; and wherein said connection matrix can be represented by a table having columns representing respective egress ports, the entries in the matrix along any column represent, in vertically descending order, the ingress ports to which the grant pointer of the corresponding egress port points, and the matrix does not contain, in the same vertically descending order, multiple instances of any combination of a first ingress port and a second ingress port.

6. A method according to claim 5 wherein the entries in the table conform to the formula:

$$M^* = \left(P + \frac{M(M+1)}{2}\right) \bmod N$$

wherein N is the number of egress ports, M is an integer index in the range 0, . . . , (N−1) which labels the rows of the matrix, P is an integer index in the range 0, . . . , (N−1) which labels the N columns of the matrix, and M* is the entry in the table at row M and column P.

7. An arbitration unit according to claim 5 which further includes, for each possible combination of an ingress port and an egress port, a working register storing a respective weight value, the working register decrements each weight value each time a connection is made in the cross-bar switch involving the corresponding ingress port and egress port, and, if there are no connection requests to a given egress port having non-zero weight values, resets the weight values for the egress port to respective default values before said selection step; and each second portion only selects a connection request if the corresponding weight value is not zero.

8. A data switching system comprising a plurality of ingress ports, a plurality of egress ports, a memory-less cross bar switch and an arbitration unit according to claim 5 arranged to control the switch.

* * * * *